US010467663B1

(12) United States Patent
Ocampo et al.

(10) Patent No.: US 10,467,663 B1
(45) Date of Patent: Nov. 5, 2019

(54) SYSTEM AND METHOD FOR GOALS-BASED FINANCIAL REGISTRY

(71) Applicant: MASSACHUSETTS MUTUAL LIFE INSURANCE COMPANY, Springfield, MA (US)

(72) Inventors: James Ocampo, Longmeadow, MA (US); Jason Cook, Westfield, MA (US); Darrell Oliveira, Longmeadow, MA (US); Christopher Soloperto, South Windsor, CT (US); Michal Knas, Monson, MA (US); Danielle Sword, Northhampton, MA (US); Julie Aldrich Rickis, Windsor, CT (US); Kirsten Taylor, West Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 612 days.

(21) Appl. No.: 15/147,333

(22) Filed: May 5, 2016

Related U.S. Application Data

(60) Provisional application No. 62/157,193, filed on May 5, 2015, provisional application No. 62/157,215, filed on May 5, 2015.

(51) Int. Cl.
| | |
|---|---|
| *G06Q 30/00* | (2012.01) |
| *G06Q 40/00* | (2012.01) |
| *G06Q 30/02* | (2012.01) |
| *G06Q 40/06* | (2012.01) |
| *G06F 3/0484* | (2013.01) |
| *G06F 3/00* | (2006.01) |

(52) U.S. Cl.
CPC ....... *G06Q 30/0279* (2013.01); *G06F 3/0484* (2013.01); *G06Q 40/06* (2013.01)

(58) Field of Classification Search
CPC ..................................................... G06Q 30/00
See application file for complete search history.

(56) References Cited

U.S. PATENT DOCUMENTS

| 6,938,008 B1 * | 8/2005 | Stokes | G06Q 40/00 |
| | | | 705/35 |
| 2009/0271287 A1 * | 10/2009 | Halpern | G06Q 20/10 |
| | | | 705/26.1 |

(Continued)

*Primary Examiner* — Kira Nguyen
(74) *Attorney, Agent, or Firm* — Eric L. Sophir; Dentons US LLP

(57) ABSTRACT

A financial registry system and method for sharing and contributing to common financial goals are disclosed herein. The system allows one or more recipients of funds to share multiple goals and select one or more products that fulfill those goals. The system allows one or more donors to provide funds or purchase one or more recommended products to contribute to the goals of recipients. An analytics engine recommends one or more insurance products that are best aligned to the shared goals of recipients. The analytics engine combines insurance products with other financial products available from service partners to provide a holistic set of financial solutions tailored to the shared goals of recipients. Furthermore, the analytics engine performs continuous analysis of current goals versus future goals in order to achieve proper goals balance. Recipients can use social networks to invite family members, relatives and friends to contribute to their goals.

1 Claim, 7 Drawing Sheets

(56) References Cited

U.S. PATENT DOCUMENTS

| | | | |
|---|---|---|---|
| 2011/0227927 A1* | 9/2011 | Garmon | B60W 50/14 345/440 |
| 2013/0041792 A1* | 2/2013 | King | G06Q 50/00 705/30 |
| 2013/0097060 A1* | 4/2013 | Taylor | G06Q 40/00 705/35 |
| 2014/0006050 A1* | 1/2014 | Feinschreiber | G06Q 40/00 705/2 |

* cited by examiner

| Goal | IRA | Brokerage / Custodian | Savings | 529/ESA/ Coverdell | Healthcare (HSA, MedSupp) | Protection (Life, DI, LTC, Annuity) |
|---|---|---|---|---|---|---|
| Education | | ✓ | ✓ | ✓ | | ✓ |
| Auto | | ✓ | ✓ | | | ✓ |
| Wedding/Honeymoon | | ✓ | ✓ | | | ✓ |
| Children | | ✓ | ✓ | | ✓ | ✓ |
| Home | | | ✓ | | | ✓ |
| Healthcare | | | ✓ | | ✓ | ✓ |
| Retirement | ✓ | | | | | |

FIGURE 4

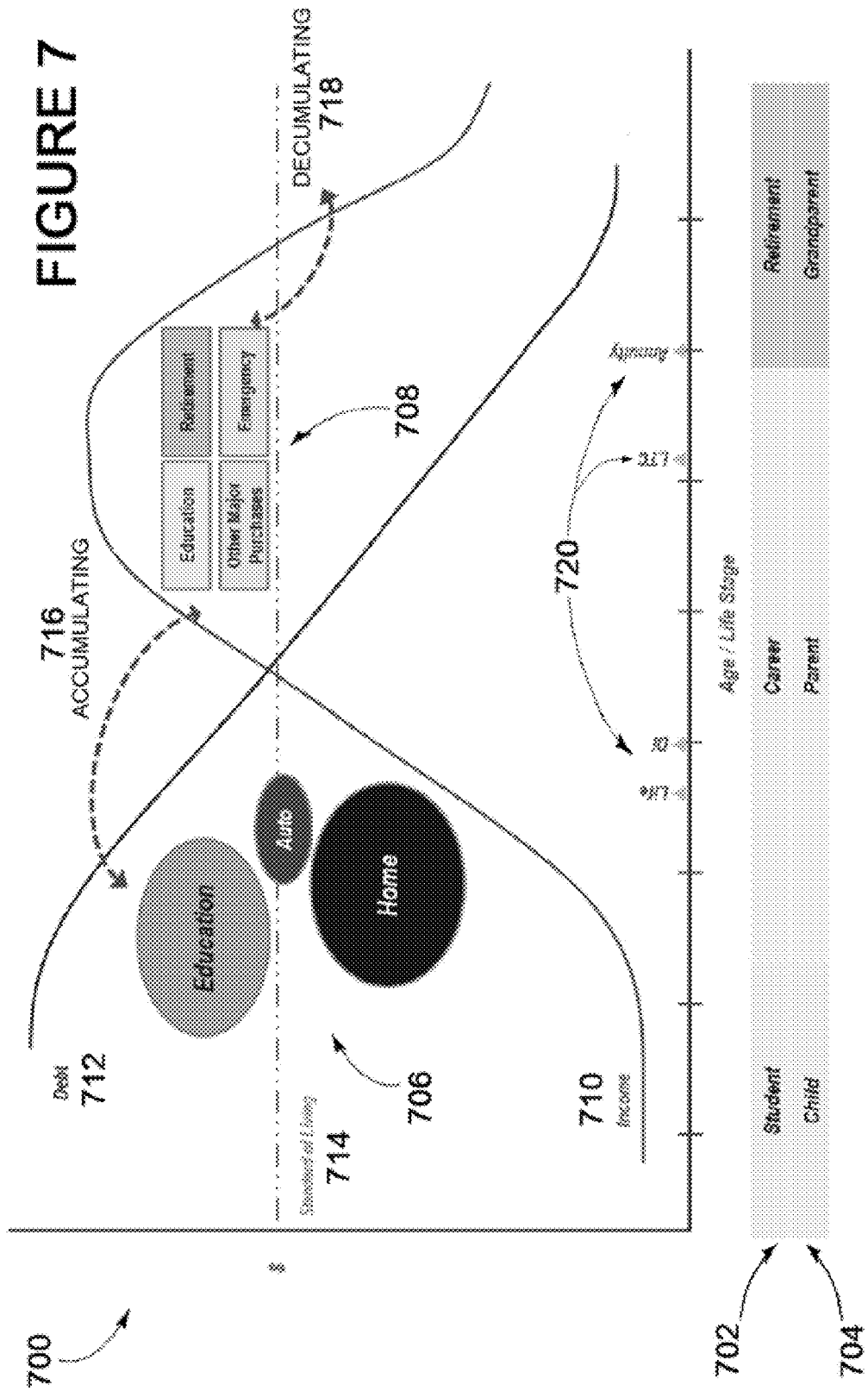

SYSTEM AND METHOD FOR GOALS-BASED FINANCIAL REGISTRY

CROSS-REFERENCE TO RELATED APPLICATIONS

This application claims priority to U.S. Provisional Patent Application No. 62/157,193, filed May 5, 2015, and U.S. Provisional Patent Application No. 62/157,215, filed May 5, 2015, all of which are incorporated by reference in their entirety.

TECHNICAL FIELD

The present disclosure relates generally to financial planning and, more specifically, to methods and systems that allow a community of people to share financial goals ad to donate assets for achieving the financial goals.

BACKGROUND

Throughout different stages of life, people often face financial challenges that can be triggered by life events, such as, the birth of a child, marriage, home purchase, start of a business, divorce, diseases, college, and the like. Within the current economic context, it has become increasingly difficult to self-fund life's major expenses.

Family members, relatives and friends usually collaborate with each other to provide economic assistance in supporting major life events for each other. Personal goals and needs are often shared among family and friends through traditional communications, such as, social gatherings, telephone conversations, personal visits, common activities, and the like. However, the geographical distance between family and friends, as well as busy daily agendas, make it increasingly difficult to find out about the need for assistance in meeting financial/personal goals of others. In addition, people willing to contribute to the goals of others often do not know the best way to help or have limited options available to help out. As a result, the possibilities of contributing to the goals of others are reduced.

For the foregoing reasons, there may be a need for methods and systems that allow for an effective way of sharing personal goals among family, relatives, and friends while providing solutions to contribute to those goals.

SUMMARY

A financial registry system and method for sharing financial goals and contributing to those shared goals are disclosed herein. The system and method allow one or more recipients of funds to set up and share one or more goals according to their current or future needs, life events, and recurring events. The system and method allow one or more donors to provide funds or purchase products to contribute to the goals of recipients.

Current computer-based systems do not provide real-time feedback as to how a contribution may benefit a recipient and make progress toward defined goals. Further, human processes are neither sufficient to provide this feedback nor do conventional processes offer such feedback to an individual other than the recipient. Accordingly, the systems and methods described herein use a computer-based system that provides additional functionality over previous computer-based systems. This functionality is described as being implemented on a network-based application (e.g., using a web browser) in a particular technological environment with features that were not available by humans alone before the establishment of this technological environment.

In one embodiment, a computer-implemented method comprises generating, by the analytics engine server, a first financial goal and a second financial goal for a recipient based upon a recipient profile data stored in a database; generating, by the analytics engine server, a graphical user interface containing a first indicator graphic having a size proportional to a value of the first financial goal and a second indicator graphic having a size proportional to a value of the second financial goal; receiving, by the analytics engine server, a transmission from a computing device of a donor comprising data representing a donor amount; generating, by the analytics engine server, first data representing an updated value of the first financial goal and an updated value of the second financial goal based on a first contribution of the donor amount to only the first financial goal; generating, by the analytics engine server, second data representing an updated value of the first financial goal and an updated value of the second financial goal based on a second contribution of the donor amount to only the second financial goal; generating, by the analytics engine server, third data representing an updated value of the first financial goal and an updated value of the second financial goal based on a third contribution of the donor amount to the first financial goal and the second financial goal; presenting, by the analytics engine server, the graphical user interface for display on the computing device of the donor having the first indicator graphic and the second indicator graphic based upon the first data; upon selection of a hyperlink representing the second contribution, dynamically adjusting, by the analytics engine server, the size of the first indicator graphic and the second indicator graphic based upon the second data; and upon selection of a hyperlink representing the third contribution, dynamically adjusting, by the analytics engine server, the size of the first indicator graphic and the second indicator graphic based upon the third data.

In another embodiment, a computer-implemented method comprises generating, by the analytics engine server, a first financial goal and a second financial goal for a recipient based upon a recipient profile data stored in a database; generating, by the analytics engine server, a graphical user interface containing a first indicator graphic having a size proportional to a value of the first financial goal and a second indicator graphic having a size proportional to a value of the second financial goal; receiving, by the analytics engine server, an input from the graphical user interface representing a donor amount and an indication of allocation of the donor amount to the first financial goal and the second financial goal; and automatically resizing, by the analytics engine server, the first indicator graphic and the second indicator graphic based upon the donor amount and the indication of allocation.

In some embodiments, a system for sharing and contributing to financial goals includes one or more donors and one or more recipients operating one or more computing devices. The computing devices are operatively coupled with a host enterprise, such as an insurance company, through a communication network. The host enterprise's infrastructure includes an analytics engine, a client database, and a product database. The computing devices support a user interface from which donors and recipients can interact with the system. Further to these embodiments, the computing devices can be operatively coupled with service partners and social networks through the communication network.

In some embodiments, one or more recipients and one or more donors share their goals with other users through the user interface running on computing devices. In these embodiments, one or more donors can browse through the list of goals of recipients presented in the user interface to select one or more goals for which they wish to contribute. Further to these embodiments, donors provide funds to recipients so that recipients can purchase one or more products that best fulfill their goals. In addition, donors can purchase products to directly contribute to the goals of recipients.

In some embodiments, a data processing module within the analytics engine receives user information for registration and creates user profiles of recipients and donors. These user profiles are stored in the client database. In these embodiments, the data processing module updates the modified user profiles of recipients and donors according to the selection of goals and products. Further to these embodiments, the data processing module supports aggregation of financial accounts and micro-lending transactions.

In some embodiments, a goals analysis module within the analytics engine generates a set of predetermined goals for recipients and donors based on their profiles. In these embodiments, the set of predetermined goals of recipients and donors can be presented through the user interface.

In other embodiments, the analytics engine generates one or more goal gauges to monitor the level of achievement for one or more goals of recipients and donors. In these embodiments, the goal gauges can be shown to recipients and donors through the user interface. Further to these embodiments, the goal gauges can be used to balance the goals of recipients and donors.

In some embodiments, recipients and donors set funding targets and priorities for goals. In other embodiments, the goals analysis module can estimate funding targets and priorities for the goals of recipients and donors based on associated user profiles and goal gauges.

In some embodiments, recipients and donors establish multiple goals, and set priorities among these goals. In these embodiments, the analysis module may allocate funds and resources based upon the priorities set by recipients and donors. In other embodiments, the analytics may evaluate a current goal against a future goal among the multiple goals to provide a proper balance in allocation of funds and resources. In further embodiments, the analysis module may compare the levels of achievement of multiple goals, and rebalance allocation of funds and resources based upon this comparison.

In some embodiments, a goals analysis module within the analytics engine analyzes the goals of recipients and donors to recommend one or more products that may fulfill those goals. In these embodiments, the goals analysis module analyzes the modified user profiles of recipients and donors to compare the goals of recipients and donors against their user profiles and available insurance products from the product database. Based on this analysis, the goals analysis module determines one or more products that best fulfill the goals of recipients and donors. Further to these embodiments, the goals analysis module continuously evaluates current goals versus future goals to provide proper balance in the allocation of funds and resources.

In some embodiments, the goals analysis module within the analytics engine receives and analyzes identified goals of the recipient, and the user interface may interact with the recipient to obtain additional information about these identified goals to quantify the financial goals of the recipient. In these embodiments, the goals analysis module may update the identified goals of recipients based upon additional information from the recipients concerning the identified goals, user profile information, and other information, to provide financial goals to include quantitative information such as funds targets or range of funds targets; time periods of financial goals such as funding target dates for funding and duration of financial goals; minimum or maximum donor contribution amounts; etc.

In some embodiments, the analytics engine generates visual representations of goals for display to recipients and donors using the user interface running on computing devices. In these embodiments, the visual representations may include charts or diagrams that provide two-dimensional geometric representations of goals. In some embodiments, the analytics engine generates visual representations the level of achievement for one or more goals of recipients and donors. In these embodiments, the visual representations may include charts or diagrams that provide two-dimensional geometric representations of the level of achievement for the one or more goals. For example, the visual representations may include one or more goal gauges that monitor the level of achievement for the one or more goals of recipients and donors.

In an embodiment, the analytics engines generates multiple versions of visual representations of one or more goals. In an embodiment, the analytics engine generates multiple versions of visual representations of levels of achievement of one or more goals. In these embodiments, the analytics engine generates a first version of visual representation for display to a recipient or donor with a first access privilege, and the analytics engine generates a second version of visual representation for display to a recipient or donor with a second access privilege.

In some embodiments, recipients share their goals through social networks such as Facebook®, Twitter®, LinkedIn®, Pinterest®, Google+™, Instagram®, and the like. In these embodiments, recipients can invite family members, relatives and friends to contribute to their goals. Further to these embodiments, contacts from social networks who wish to contribute to the goals of recipients can register in the system as donors.

In some embodiments, the goals analysis module recommends products available from service partners in order to complement the insurance product offering. In these embodiments, service partners include banks, government agencies/programs, brokerage firms, online retailers, online gift shops, and digital wallet e-commerce companies, among others.

In some embodiments, a method for sharing and contributing to goals include the steps of registering one or more users as donors or recipients; setting up one or more goals according to current or future needs, life events or recurring events of recipients and donors; analyzing modified user profiles by comparing the shared goals with the user profiles of recipients and donors and available products; recommending one or more products that may fulfill the established goals; selecting one or more products; inviting donors within the system, as well as family members, relatives and friends in social networks to contribute to the shared goals; donating funds to recipients according to shared goals; purchasing one or more products that may fulfill the shared goals; and adjusting the goals and recommended products according the changing needs of recipients and donors over time.

In one embodiment, a computer-implemented method comprises receiving, by an analytics engine server, a transmission of data representing recipient profile data and donor profile data; analyzing, by the analytics engine server, the received recipient profile data to identify at least one recipient need; generating, by the analytics engine server, a first financial goal and a second financial goal for the recipient based upon the recipient profile data; receiving, by the analytics engine server, a transmission from a computing device of a donor comprising data representing donor profile data and a donor amount; determining, by the analytics engine server, how a first contribution of the donor amount to the first financial goal affects the first financial goal, a second contribution of the donor amount to the second financial goal affects the second financial goal, and a third contribution of a first portion of the donor amount to the first financial goal and a second portion of the donor amount to the second financial goal affects the first and second financial goals; presenting, by the analytics engine server, a user interface for display on a computing device of the donor a graphical representation of the determining how the first contribution of the donor amount to the first financial goal affects the first financial goal, the second contribution of the donor amount to the second financial goal affects the second financial goal, and the third contribution of a first portion of the donor amount to the first financial goal and a second portion of the donor amount to the second financial goal affects the first and second financial goals, wherein the first, second, and third contribution are presented as options for selection by the donor for contributing the donor amount to the at least one recipient need; receiving, by the analytics engine server, a transmission comprising a representation of a selection of the first, second, or third contribution from the user interface of the computing device of the donor for application of the donor amount to be applied to the at least one recipient need; and upon receiving the transmission comprising the representation of the selection, automatically generating a message requesting payment based upon the selection of the first, second, or third contribution to be applied to the at least one recipient need.

In another embodiment, a financial registry system for presenting financial goals of a recipient to a donor, and for facilitating contribution by the donor to the financial goals of the recipient, comprises an analytic engine server configured with a computer-readable storage medium and including host components executable by the analytic engine server, the host components comprising a client database component that stores recipient profile data associated with the recipient, wherein the recipient profile comprises at least one recipient need; a products component that stores data on a plurality of financial products available for selection by the donor, including data on a given product associated with the at least one recipient need; and a goals analysis component that receives a request message from a user computing device of the donor for access to one or more financial goals of the recipient; that retrieves the recipient profile data from the client database component; that determines the given product associated with the at least one recipient need; that generates a financial goal of the recipient based upon the at least one recipient need and the product; and that presents a user interface for display of a graphical representation of the financial goal of the recipient on the user computing device of the donor; wherein the user interface presents a selection for the donor to choose whether to contribute a monetary amount to the financial goal, wherein the monetary amount is applied to the product for the recipient.

In a further embodiment, a financial registry system for presenting financial goals of a recipient to the recipient and to donors, and for facilitating donors contributions to the financial goals of the recipient, the system comprising an analytic engine server configured with a computer-readable storage medium and including host components executable by the analytic engine server, wherein the host components comprise a client database component that stores recipient profile data associated with the recipient, wherein the recipient profile comprises at least one recipient need; a products component that stores data on a plurality of financial products including products available for purchase from a host enterprise of the financial registry system, and products available for purchase from service partners of the host enterprise; and a goals analysis component that receives a request message from a user computing device of the donor for access to one or more financial goals of the recipient; that determines a given product associated with the at least one recipient need from the data on a plurality of financial products; that generates a financial goal of the recipient based upon the recipient profile data; and that presents a user interface for display on the user computing device of the donor of a graphical representation of the financial goal of the recipient, and a selection for the donor to choose whether to contribute a monetary amount to the financial goal.

In another embodiment, a computer-implemented method comprises receiving, by an analytics engine server, a transmission of data representing recipient profile data and donor profile data; identifying, by the analytics engine server, at least one recipient need based upon the received recipient profile data; generating, by the analytics engine server, a first financial goal and a second financial goal for the recipient based upon the recipient profile data; receiving, by the analytics engine server, a transmission from a computing device of a donor comprising data representing donor profile data and a donor amount; determining, by the analytics engine server, how a first contribution of the donor amount to the first financial goal affects the first financial goal, a second contribution of the donor amount to the second financial goal affects the second financial goal, and a third contribution of a first portion of the donor amount to the first financial goal and a second portion of the donor amount to the second financial goal affects the first and second financial goals; presenting, by the analytics engine server, a user interface for display on a computing device of the donor a graphical representation of the determining how the first contribution of the donor amount to the first financial goal affects the first financial goal, the second contribution of the donor amount to the second financial goal affects the second financial goal, and the third contribution of a first portion of the donor amount to the first financial goal and a second portion of the donor amount to the second financial goal affects the first and second financial goals, wherein the first, second, and third contribution are presented as options for selection by the donor for contributing the donor amount to the at least one recipient need; and receiving, by the analytics engine server, a transmission comprising a representation of a selection of the first, second, or third contribution from the user interface of the computing device of the donor for application of the donor amount to be applied to the at least one recipient need.

In a further embodiment, a computer-implemented method comprises generating, by the analytics engine server, a first financial goal for the recipient and a second financial goal for the recipient; receiving, by the analytics engine server, a transmission from a computing device of a donor comprising data representing donor profile data and a donor amount; determining, by the analytics engine server, how a first goal contribution assumption affects the first financial goal and the second financial goal, and how a second goal contribution assumption affects the first financial goal and the second financial goal; presenting, by the analytics engine server, a user interface for display on a computing device of the donor a graphical representation of the determining how the first goal contribution assumption affects the first financial goal and the second financial goal, and how the second goal contribution assumption affects the first financial goal and the second financial goal, wherein the first goal contribution assumption and the second goal contribution assumption are presented as options for selection by the donor for contributing the donor amount to at least one of the first financial goal and the second financial goal; and receiving, by the analytics engine server, a transmission comprising a representation of a selection of one of the first goal contribution assumption and the second goal contribution assumption from the user interface of the computing device of the donor for application of the donor amount to be applied to the at least one of the first financial goal and the second financial goal.

In another embodiment, a financial registry system for presenting financial goals of a recipient to a donor, and for facilitating contribution by the donor to the financial goals of the recipient, comprises an analytic engine server configured with a computer-readable storage medium and including host components executable by the analytic engine server, the host components comprising a client database component that stores recipient profile data associated with the recipient, wherein the recipient profile comprises at least one recipient need, and that stores donor profile data associated with a donor; and a goals analysis component that generates a first financial goal and a second financial goal for the recipient; that receives a donor amount from a computing device of the donor; the determines how a first goal contribution assumption affects the first financial goal and the second financial goal, and how a second goal contribution assumption affects the first financial goal and the second financial goal; that presents a user interface for display on the computing device of the donor of a graphical representation of the how the first goal contribution assumption affects the first financial goal and the second financial goal, and a graphical representation of the how the second goal contribution assumption affects the first financial goal and the second financial goal; that presents the first goal contribution assumption and the second goal contribution assumption as options for selection by the donor for contributing the donor amount to at least one of the first financial goal and the second financial goal; wherein the goals analysis component applies the donor amount to the at least one of the first financial goal and the second financial goal based upon receipt by the goals analysis component of a selection by the donor of one of the first goal contribution assumption and the second goal contribution assumption.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 4 is an exemplary table illustrating the matching of a plurality of goals with a plurality of products, according to an embodiment.

FIG. 7 is a diagram describing financial circumstances and financial goals of a recipient at various life stages of the recipient, as well as various products to fulfill those financial goals.

DETAILED DESCRIPTION

Figure 1:
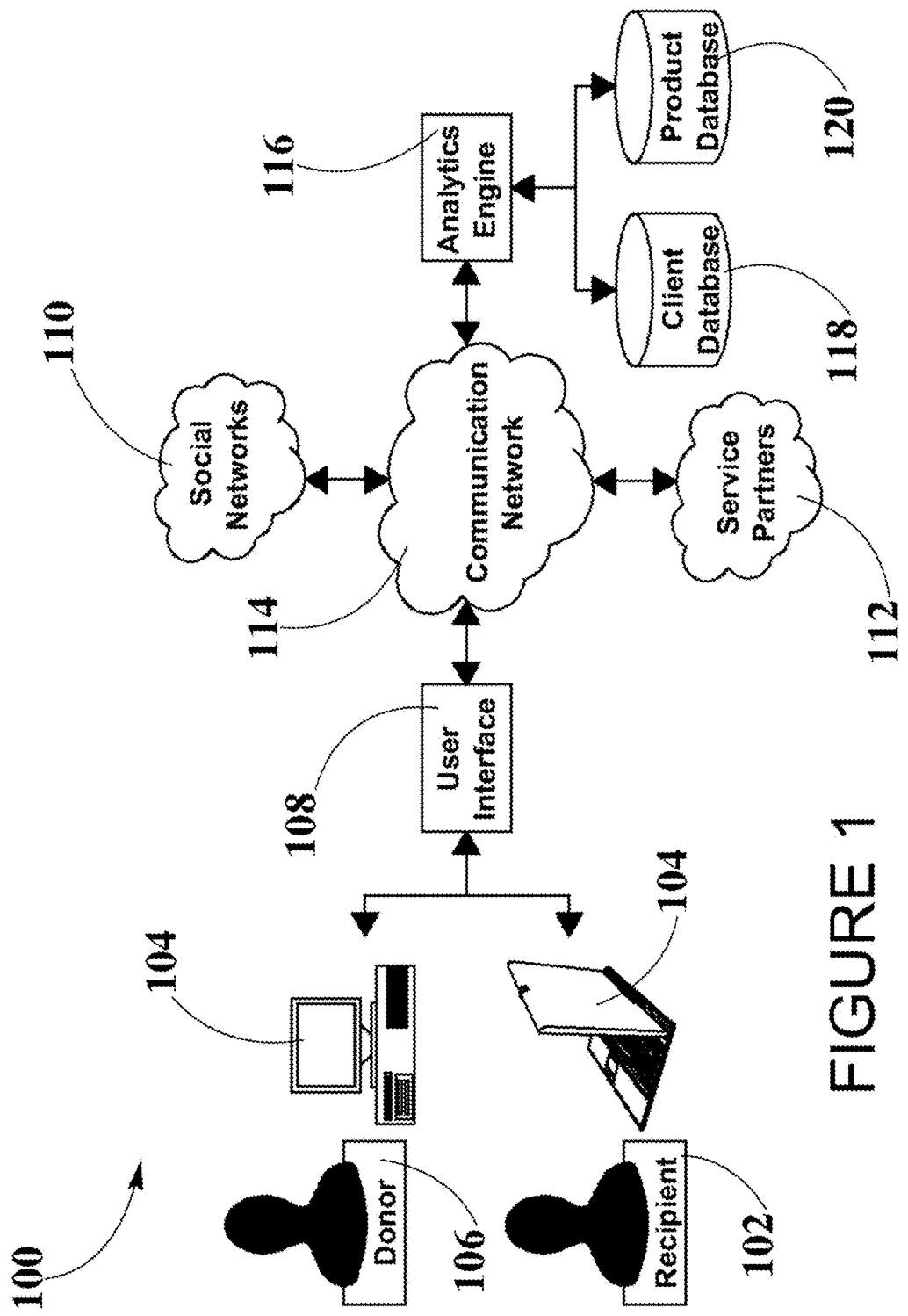
FIG. 1 is a block diagram illustrating an exemplary financial registry system for providing financial solutions to donors and recipients according to established goals, in accordance with an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1 is a block diagram illustrating a financial registry system for providing financial solutions to donors and recipients according to established goals, in accordance with an embodiment. In FIG. 1, financial registry system 100 includes one or more recipients 102, one or more computing devices 104, one or more donors 106, user interface 108, one or more social networks 110, one or more service partners 112, communication network 114, analytics engine 116, client database 118, and product database 120. It should be understood that financial registry system 100 can include more components, less components, or different components depending on desired system architecture and functionality.

In an embodiment, a "recipient" refers to a user who has established goals and receives contributions from one or more donors. In an embodiment, a "donor" refers to a user who contributes to established goals by providing funds to recipients or buying products that may assist in the fulfillment of established goals.

In FIG. 1, one or more recipients 102 are coupled to and in bidirectional communication with one or more computing devices 104 and one or more donors 106 are coupled to and in bidirectional communication with one or more computing devices 104. One or more computing devices 104 are coupled to and in bidirectional communication with user interface 108, and user interface 108 is coupled to and in bidirectional communication with communication network 114. Communication network 114 is coupled to and in bidirectional communication with one or more social networks 110, one or more service partners 112, and analytics engine 116. Analytics engine 116 is coupled to and in bidirectional communication with client database 118 and product database 120.

In FIG. 1, analytics engine 116 is configured to analyze goal data and generate a list of products to present to recipients and donors so that one or more products can be selected in order to fulfill one or more goals. In some embodiments, analytics engine 116 is configured to receive user information from user interface 108, produce an associated user profile based on the user information, and store the user profile in a database. In these embodiments, analytics engine 116 is further configured to receive goal data from user interface 108, and product data and an associated user profile from a database, produce a modified user profile based on the goal data, product data, and the associated user profile, and send the modified user profile to a database or to user interface 108 when requested. Further to these embodiments, analytics engine 116 is configured to receive the modified user profile from a database, generate a product list based on the associated modified user profile, and send the product list to user interface 108. In these embodiments, analytics engine 116 is configured to receive donor instructions and/or recipient instructions from user interface 108, generate transactions based on the received donor and/or recipient instructions, and initiate the generated transactions.

In some embodiments, analytics engine 116 is implemented as a set of computer instructions executed by one or more central processing units that run computer executable program instructions or related algorithms. Each central processing unit may be a component of computing devices such as a server, a single computer, or multiple computers in a distributed configuration. In an example, a central processing unit as described in FIG. 2 below can be implemented within the aforementioned computing devices.

In FIG. 1, user interface 108 is configured to interact with recipients and donors to receive goal data from the recipients and donors and to present a product list to the recipients and donors so that one or more products can be selected in order to fulfill one or more goals. In some embodiments, user interface 108 is configured to receive user information from recipients 102 and/or donor 106 and goal data from recipient 102 and/or donor 106 via computing device 104 and pass the user information and goal data to analytics engine 116 via a communication network 114. Goal data define one or more user goals. In these embodiments, user interface 108 is further configured to receive donor instructions from donor 106 via computing device 104 and recipient instructions from recipient 102 via computing device 104 and pass the donor instructions and recipient instructions to analytics engine 116 via communication network 114. Further to these embodiments, user interface 108 is configured to receive a modified user profile and a product list and pass the modified user profile and/or the product list to recipient 102 and/or donor 106 via computing device 104.

In some embodiments, user interface 108 is implemented as a set of computer instructions executed by central processing units that run computer executable program instructions or related algorithms, running on computing devices 104. In an example, user interface 108 presents a product list (e.g., a plurality of financial solutions) to recipients 102 and donors 106 from which they select one or more financial solutions from the product list to contribute toward the funding of the established goals of recipient 102. In some embodiments, user interface 108 can be implemented as a portal that users can access via a browser at computing devices 104. In another embodiment, user interface 108 is a downloadable application executable on computing devices 104.

In some embodiments, client database 118 and product database 120 are implemented as relational databases that provide the functions of fetching, indexing, and storing data. In these embodiments, client database 118 and product database 120 include user information associated with recipients and donors, and product data that can be accessed, managed and updated according to embodiments described herein. In some embodiments client database 118 receives, stores, and provides user profiles and modified user profiles from/to analytics engine 116. In some embodiments product database 120 receives, stores, and provides product data and a product list from/to analytics engine 116.

In some embodiments, client database 118 and product database 120 can be housed locally or remotely, for instance, in a secure, scalable facility. For security and reliability, redundancy may be employed in client database 118 and product database 120. Examples of client database 118 and product database 120 may include MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of user and product data.

Various components of the financial registry system 100, at a minimum including the analytics engine 116, client database 118, and product database 120, are sometimes referred to as the "host" or "host components" of the system. The term host signifies a computer system that is accessed by users working at remote locations, such as recipients 102 and donors 106, in which the host components contain the primary data of financial registry system 100. "Host" also is used in the sense of an infrastructure for the financial registry service to recipients and donors, with associated files, programs and applications. In some embodiments the host components and the associated financial registry service are managed by a financial services enterprise, such as an insurance company, sometimes referred to herein as the "host enterprise".

In some embodiments, communication network 114 includes hardware and associated software for allowing communications between various components of financial registry system 100. Examples of communication network 114 include intranets, local area networks (LAN), the cloud, virtual private networks (VPN), wireless area networks (WAN) and the internet, among others.

In other embodiments, social networks 110 are implemented as a set of computer instructions executed by central processing units that run computer executable program instructions or related algorithms on a server that allow individuals or organizations to establish ties between themselves using the Internet. Examples of social networks 110 include Facebook®, Twitter®, LinkedIn®, Pinterest®, Google+™ Instagram®, and the like.

In certain embodiments the financial registry system 100 is associated with a financial services enterprise, such as an insurance company, acting as the host enterprise. In these embodiments, the product database 120 may include product and service offerings of the insurance company, as well as offerings from service partners 112, i.e. businesses that provide products and services associated with the insurance company offerings. Examples of service partners 112 include banks, government agencies/programs, brokerage firms, online retailers, online gift shops, and digital wallet e-commerce companies, among others. In some embodiments, service partners 112 can be crowd-funding partners.

In some embodiments, computing devices 104 include a set of software instructions in combination with hardware equipment to allow recipients 102 and donors 106 to interact with various components of financial registry system 100. Examples of computing devices 104 include smartphones, desktop computers, laptop computers, tablets, and PDAs, among others.

In one embodiment, recipient 102 registers with financial registry system 100 through user interface 108 running on computing device 104. In this embodiment, recipient 102 can be a member of a family with a particular financial goal. For example, recipient 102 can be a young parent with the financial goal of acquiring life and health insurance after the birth of a firstborn child.

In an embodiment, donor 106 registers in financial registry system 100 through user interface 108 running on computing device 104. According to some aspects of this embodiment, donor 106 can be a person willing to contribute to the financial goals of family members, relatives or friends, which are also registered as recipients 102 in financial registry system 100.

In an example, recipient 102 interacts with user interface 108 to set up a financial goal; for example: "I need life and health insurance after the birth of my firstborn child". Continuing this example, recipient 102 can establish a plurality of goals which can be shared with other users through financial registry system 100. In this way, recipients 102 can share their financial goals with family members, relatives and friends, in an interconnected network of collaboration.

In another example, donor 106 can interact with user interface 108 to browse through a plurality of goals previously established by one or more recipients 102. Continuing the example, donor 106 can be a professional who has recently retired and would like to see the current financial needs or goals of his son or daughter. Further to this example, the retired professional or donor 106 can contribute with one or more financial goals of his son or daughter by providing funds or purchasing one or more financial products.

In some embodiments in which recipients establish a plurality of goals, recipients and donors may set priorities among these goals. In these embodiments, the analytics engine 116 may allocate funds and resources based upon the priorities set by recipients and donors. In other embodiments, analytics engine 116 may evaluate a current goal against a future goal among the multiple goals to provide a proper balance in allocation of funds and resources. In further embodiments, analytics engine 116 may compare the levels of achievement among the plurality of goals, and may rebalance the allocation of funds and resources based upon this comparison.

In some embodiments, analytics engine 116 receives user information from users who would like to register as donors 106 or recipients 102. In these embodiments, donors 106 and recipients 102 can input user information through user interface 108 running on computing devices 104 operatively coupled with analytics engine 116. Donors 106 and recipients 102 can setup usernames and passwords to create user profiles that can be stored in client database 118. These user profiles can also include additional user information such as age, ethnicity, place of residence, number and identity of dependent persons (e.g. children, dependent adults), expenditure, savings, approximate market value of assets and their composition, education, and professional status, among others. Further to these embodiments, client database 118 includes modified user profiles associated with registered recipients 102 and donors 106.

Financial registry system 100 receives, analyzes, tracks, and fulfills recipients' goals in various levels of development and in various formats. In some embodiments, the goals analysis module within the analytics engine 116 can receive identified goals of recipients and analyzes these identified goals to develop more fully defined financial goals of the recipient. Identified goals may be qualitative in nature, as in the above example: "I need life and health insurance after the birth of my firstborn child". Financial registry system 100 may request additional information from recipients concerning identified goals via user interface 108. In these embodiments, the goals analysis module 324 (FIG. 3) may update the identified goals of recipients based upon additional information from the recipients concerning the identified goals, user profile information, and other sources of information. The updated identified goals represent quantified financial goals of the recipients, which may include quantitative information such as funds targets or range of funds targets; time periods of financial goals such as funding target dates for funding and duration of financial goals; minimum or maximum donor contribution amounts; etc.

In another format of goals, the analytics engine 116 generates visual representations of goals for display to recipients and donors using the user interface 108 running on computing devices. In these embodiments, the visual representations may include charts or diagrams that provide two-dimensional geometric representations of goals. In other embodiments, the analytics engine 116 generates visual representations the level of achievement for one or more goals of recipients and donors. In these embodiments, the visual representations may include charts or diagrams that provide two-dimensional geometric representations of the level of achievement for the one or more goals. In these embodiments, the visual representations may include one or more goal gauges that monitor the level of achievement for the one or more goals of recipients and donors. Additional types of charts or diagrams that can be used for goal representations include line graphs, bar charts, pie charts, timeline charts, tree charts, flow charts, area charts, and bubble charts, among others. Goal representations may include data files corresponding to visual representation of goals (such as image files), as well as audiovisual displays of the goal representations by the user interface 108.

In the present disclosure, the terms "goals" and "financial goals" in referring to recipient goals may include identified financial goals, i.e. goals identified by recipients or donors that may be qualitative or general in nature. Although goals or financial goals are typically established by recipients based upon recipients' needs, goals also may be established by donors based upon donation objectives. The terms "goals" and "financial goals" also may refer to quantified financial goals (also herein called quantified goals), which may be generated by the analytics engine 116, for example by updating identified financial goals with quantitative goal data. The terms "goals" and "financial goals" also may refer to audiovisual representations of financial goals for display to recipients and donors, sometimes called "goal representations" or "represented goals". Goal representations also include audiovisual representations of levels of achievement of financial goals.

In one embodiment, recipients 102 have access to a plurality of social networks 110 through user interface 108 running on computing devices 104. In an example, recipients 102 can invite family members, relatives or friends to contribute to their goals through social networks 110. In this example, recipients 102 can share the goal of "please contribute to my goal of acquiring health and life insurance after the birth of my firstborn child" with family members, relatives and friends in social networks 110. Further to this example, those family members, relatives or friends who would like to contribute to the established goals of recipients 102 can register in financial registry system 100 as donors 106.

In some embodiments, recipients 102 and donors 106 establish one or more goals manually in financial registry system 100. For example, a parent registered as recipient 102 can set the goal of having a particular amount of savings for his/her kid's college. In this example, a grandparent registered as donor 106 can set the goal of contributing for his/her grandchild's education. Further to this example, recipient 102 and donor 106 can use a keyboard of computing device 104 to enter goal data via user interface 108.

In some embodiments, recipients 102 and donors select one or more goals from a list of predetermined goals presented through user interface 108 running on computing devices 104. For example, recipients 102 and donors 106 can browse through a list of goals and select one or more goals depending on their needs and donation plans. In this example, analytics engine 116 analyzes the user profiles of recipients 102 and donors 106 to generate a list of predetermined goals that best fit the user profiles of recipients 102 and donors 106. In this example, analytics engine 116 can analyze the user profiles of recipients 102 and donors 106 stored in client database 118 and apply predictive algorithms to forecast goals or needs depending on a combination of factors such as age, gender, health condition, marital status, life stage, number of dependent children, financial status, and the like. Further to this example, analytics engine 116 provides recommendations on how to balance the goals between donors 106 and recipients 102.

In some embodiments, analytics engine 116 can recommend one or more goals to recipients 102 based on life events reported by recipients 102, including marriage, graduation, birth of children, and the like. In these embodiments, analytics engine 116 can also recommend one or more goals to recipients 102 based on recurring events such as holidays and birthdays.

In some embodiments, analytics engine 116 presents a product list (e.g., a plurality of financial/insurance products) to recipients 102 and donors 106 through user interface 108 running on computing devices 104. Analytics engine 116 analyzes the modified user profiles of recipients 102 and donors 106 in order to present one or more insurance products that may satisfy the goals set by recipients 102 and donors 106. In some embodiments, analytics engine 116 selects from product database 120 one or more insurance products that may fulfill the goals set by recipients 102 and donors 106. In these embodiments, analytics engine 116 can employ goals analysis algorithms such as NestLife algorithm to select and present one or more insurance products that may satisfy the goals set by recipients 102 and donors 106. Product database 120 includes product data about a plurality of insurance products and services offered by the insurance company. Examples of insurance products that can be recommended to recipients 102 or donors 106 include annuities, disability income (DI) insurance, individual retirement account (IRA), investments, life insurance, long term care (LTC) insurance, 529 plans, and the like.

In some embodiments, analytics engine 116 is operatively coupled with one or more service partners 112 through communication network 114 in order to complement the insurance products or services offered by the insurance company. In an example, for young parents with children and looking for healthcare protection, analytics engine 116 can select from service partners 112 a savings account and a health savings account (HSA) to complement life insurance. As a result, analytics engine 116 can present a holistic set of financial solutions that include savings, healthcare and protection to the young parents.

In operation, a user registers as recipient 102 or donor 106 depending whether the user wants to share a goal or contribute to a goal. User provides user information that can be input through user interface 108 running on computing devices 104 which are operatively connected to analytics engine 116. Analytics engine 116 receives user information from recipient 102 and donor 106, and creates user profiles which can be stored in client database 118. Recipient 102 and donors 106 select one or more goals which can be shared with other users of financial registry system 100. Analytics engine 116 recommends one or more insurance products from product database 120 that may fulfill the selected goals. Analytics engine 116 can also recommend one or more financial or other type of products from service partners 112 that may complement the insurance product offering. Donor 106 browses the list of goals presented on user interface 108 and selects one or more goals for which he/she wishes to contribute. Donor 106 provides funds to contribute to one or more goals, or purchases one or more products to contribute to those goals. Recipient 102 uses the provided funds to purchase one or more products to fulfill his/her goals.

In some embodiments, financial registry system 100 aggregates various financial accounts of donors 106 and recipients 102 to support financial transactions related to the purchase of products and transfer of funds. For example, service partners 112 can be financial institutions having financial accounts of donors 106 and recipients 102. In this example, analytics engine 116 can communicate with service partners 112 through communication network 114 to recommend or initiate the transfer of funds from a donor 106 account to a recipient 102 account to fund an established goal. Further to this example, analytics engine 116 can process direct payments from recipients 102 and donors 106 for the purchase of financial products offered through the insurance company or service partners 112.

FIG. 7 is a diagram 700 of financial circumstances and financial goals of a recipient at various life stages of the recipient. This diagram plots recipient income 710 and debt 712 at various life stages, shown as life statuses 702 (student/career/retirement) and family roles 704 (child/parent/grandparent). Life stages through late career are shown as a period of increasing income 710, decreasing debt 712, and accumulating funds 716, while retirement is shown as a period of decreasing income 710 and decumulating funds 718. This diagram shows a first set of financial goals 706—education, home, and automobile—at early life stages bridging student years and early career. A second set of financial goals 708—including education (of dependents), retirement, other major purchases, and emergency funds—are shown for later life stages including late career and retirement. A target standard of living is shown at 714.

FIG. 7 illustrates examples of the present financial registry system's identification and analysis of financial goals of recipients and donors, and examples of recommendation of products to fulfill these financial goals. Financial goals 706, 708 may be based on instructions received by the financial registry system from recipients or donors; may be based on analysis of identified goals from recipients or donors by the analytics engine 116; and may include predetermined goals generated by the goals analysis module within the analytics engine 116 based upon recipient and donor profiles (e.g. data on income 710, debt 712, life stages 702, 704, and targeted standard of living 714); among other possibilities. Prioritization of financial goals among the plurality of goals 706, 708 may be based on instructions from recipients and donors. In addition, the analytics engine 116 may evaluate early life-stages goals 706 against later life-stages goals 708 to provide a proper balance in allocation of current versus future funds and resources. The goals analysis module within analytics engine 116 analyzes these various financial goals to recommend products 720 that may fulfill those goals, such as life insurance, disability insurance (DI), care insurance (LTC), and annuities. The goals analysis module also may recommend products and services 720 of service partners 112 (not shown).

Figure 2:
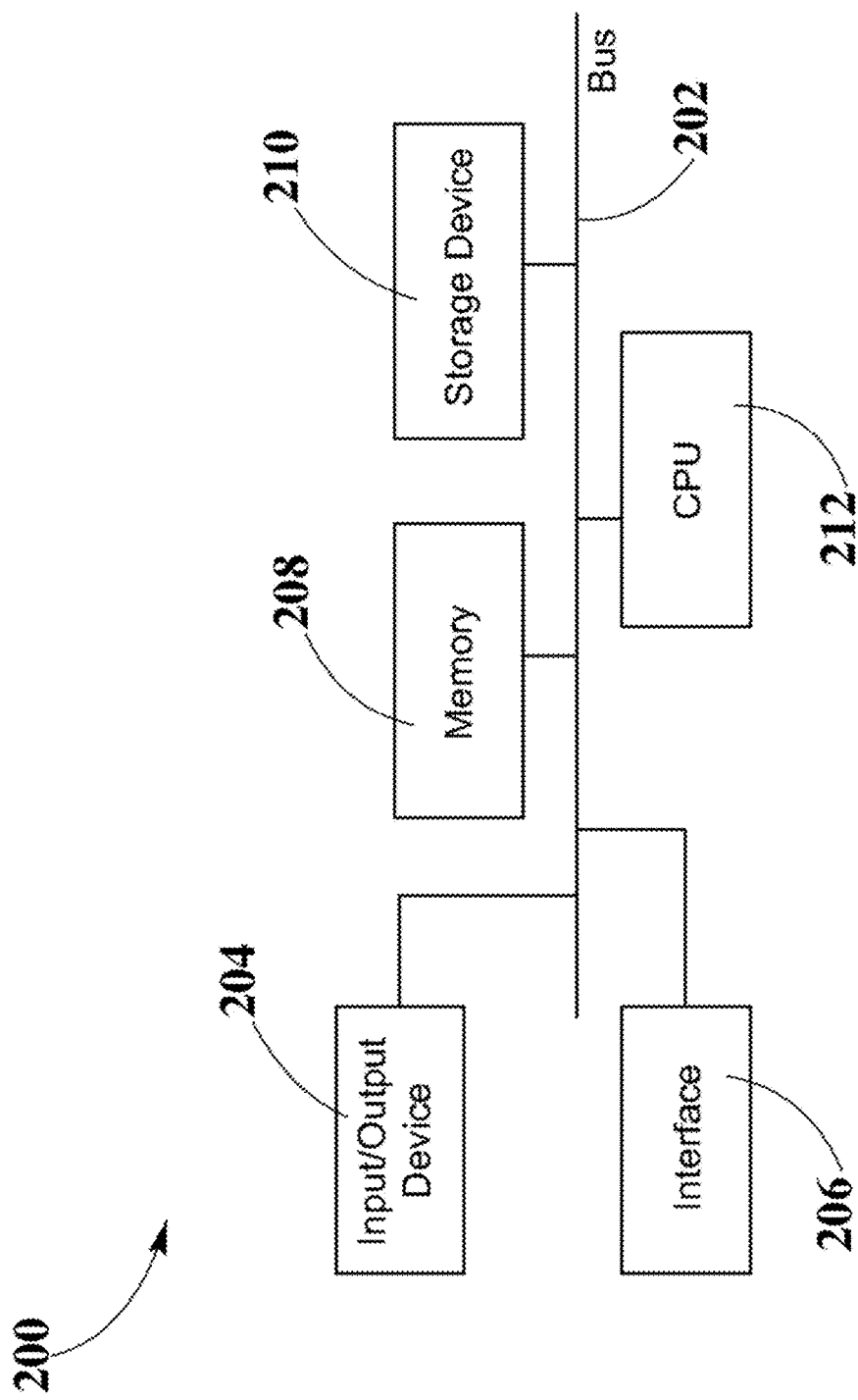
FIG. 2 is a block diagram illustrating an exemplary computing device or server in which one or more embodiments of the present disclosure operate, according to an embodiment.

FIG. 2 is a block diagram of example components of a computing device 200 that may correspond to analytics engine 116 and client computing device 104, among other components of financial registry system 100, according to an embodiment. According to some aspects of this embodiment, computing device 200 includes a bus 202, input/output device 204, communication interface 206, memory 208, storage device 210 and central processing unit 212. In another embodiment, computing device 200 includes additional, fewer, different, or differently arranged components than those illustrated in FIG. 2.

Bus 202 includes a path that permits components within computing device 200 to communicate with each other. Input/output device 204 includes peripherals and/or other mechanisms that may enable a user to input information to computing device 200, including a keyboard, computer mice, buttons, touch screens, voice recognition, and biometric mechanisms, among others. Input/output device 204 also includes a mechanism that outputs information to the user of computing device 200 such as, for example, a display, a light emitting diode (LED), a printer, and a speaker, among others. Communication interface 206 includes mechanisms that may enable computing device 200 to communicate with other computing devices and/or systems through network connections. Network connections may refer to any connections between computers such as, for example, intranets, local area networks (LAN), virtual private networks (VPN), wireless area networks (WAN) and the internet among others. Memory 208 includes a random access memory (RAM) or another type of dynamic storage device that may store information and instructions for execution by central processing unit 212. Storage device 210 includes a magnetic and/or optical recording medium such as read-only memory, flash memory, ferro-electric RAM (F-RAM) hard disks, solid-state drives, floppy disks, and optical discs, among others. Central processing unit 212 includes a microprocessor, an application specific integrated circuit (ASIC), and field programmable object array (FPOA), among others, which may interpret and execute instructions.

According to some aspects of this embodiment, at least one computing device 200, such as, a server, a smartphone, a desktop computer, a laptop computer, a tablet computer, a PDA, and/or another type of processor-controlled device that may receive, process, and/or transmit digital data, among others, may perform certain operations that may be required for the proper operation of analytics engine 116. Computing devices perform these operations in response to central processing unit 212 executing software instructions contained in a computer-readable medium, such as memory 208.

The software instructions may be read into memory 208 from another computer-readable medium, such as storage device 210, or from another computing device via communication interface 206. The software instructions contained in memory 208 instruct central processing unit 212 to perform processes that will be described in FIG. 5, below. Alternatively, hardwired circuitry may be used in place of or in combination with software instructions to implement processes described herein. Thus, implementations described herein are not limited to any specific combination of hardware circuitry and software.

Figure 3:
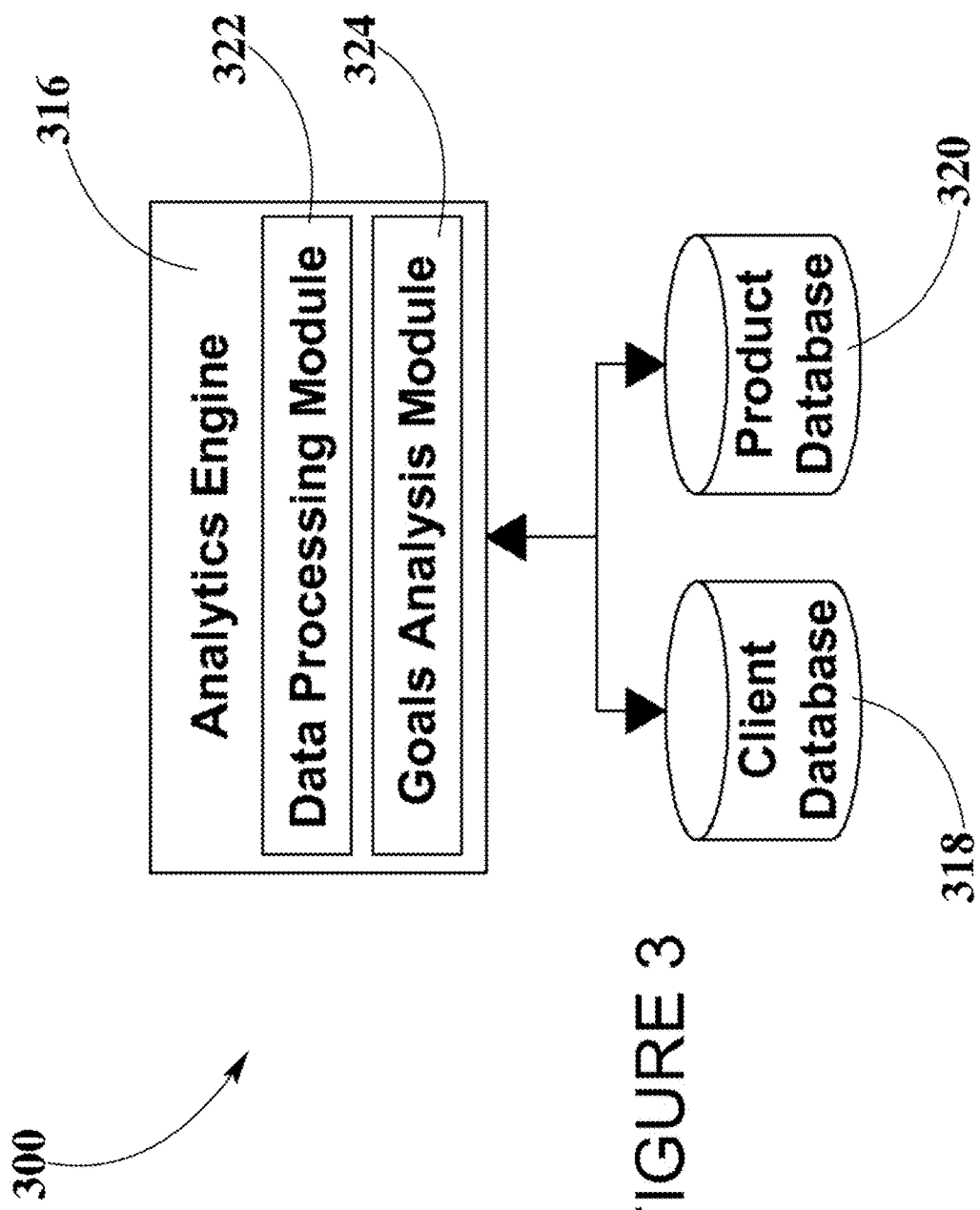
FIG. 3 is a block diagram illustrating an exemplary subsystem of an exemplary financial registry system that may be part of the infrastructure of an insurance company, according to an embodiment.

FIG. 3 is a block diagram of an exemplary subsystem of an analytics engine and other components of a financial registry system. In some embodiments, subsystem 300 can be part of the infrastructure of an insurance company. In FIG. 3, subsystem 300 includes a client database 318, a product database 320, and an analytics engine 316. Analytics engine 316 further includes a data processing module 322 and a goals analysis module 324. It should be understood that subsystem 300 can include less components, more components, or different components depending on the desired analysis goals.

In FIG. 3, analytics engine 116 is operatively coupled to and in communication with client database 318 and product database 320 through a suitable communication network. In an example referring also to FIG. 1, analytics engine 316 functions in a substantially similar manner as analytics engine 116 within financial registry system 100. Continuing the example, client database 318 and product database 320 function in a substantially similar manner as client database 118 and product database 120, respectively, within financial registry 100.

Figure 5:
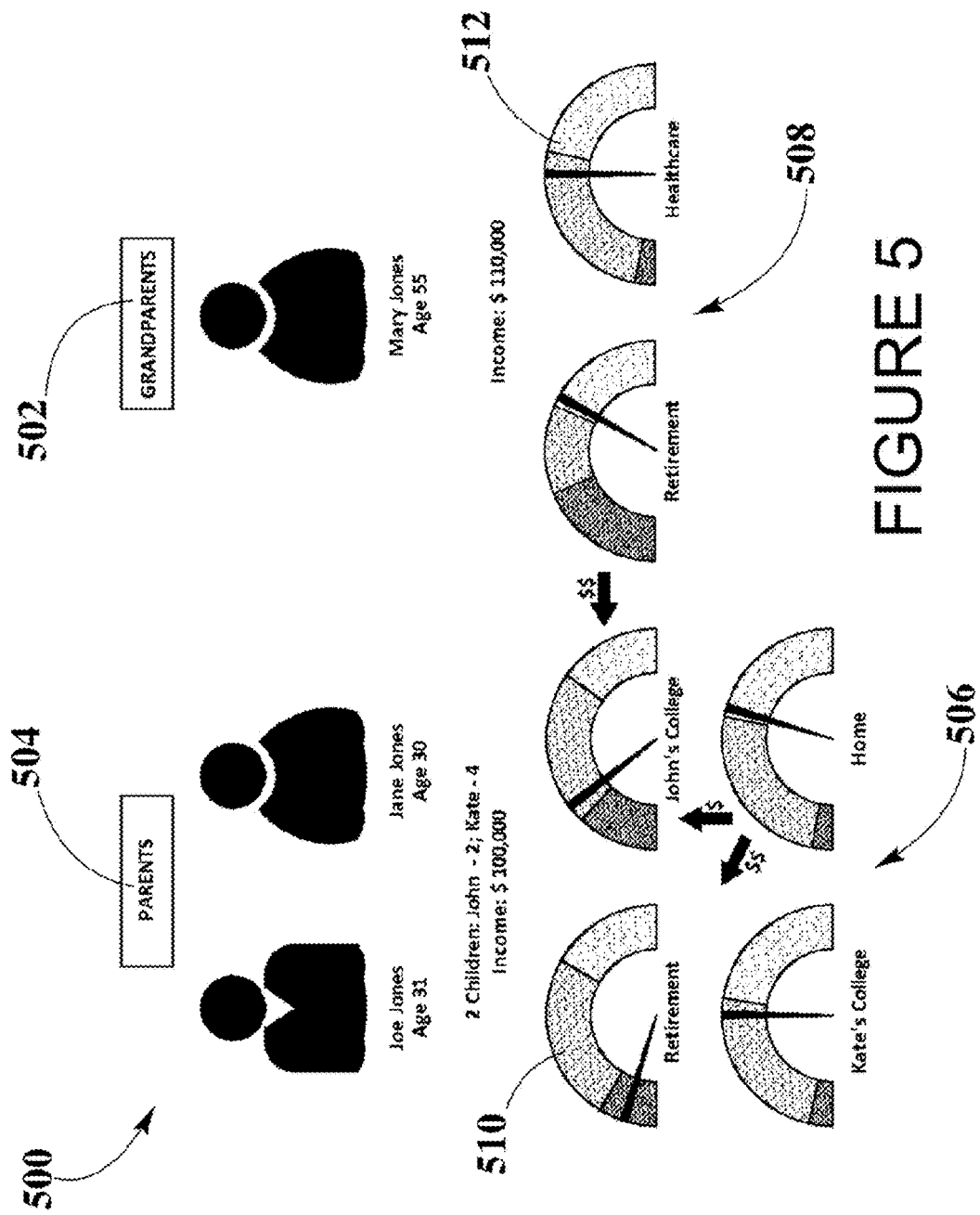
FIG. 5 illustrates an exemplary scenario for balancing and monitoring the goals of recipients and donors, according to an embodiment.

In some embodiments, each software module within analytics engine 316 includes a separate processing unit for running algorithms or computer executable program instructions related to the operation of the method described in FIG. 5. The processing unit may include a processor with computer-readable medium, such as a random access memory (RAM) (not shown) coupled to the processor. Examples of processors may include a microprocessor, application specific integrated circuit (ASIC), and field programmable object array (FPOA), among others.

In some embodiments, data processing module 322 receives user information from users who would like to register as donors or recipients. Data processing module 322 creates user profiles for recipients and donors, and stores the user profiles at client database 318. Data processing module 322 updates the user profiles of recipients and donors depending on how they share and contribute to goals defined by goal data stored within the financial registry system. Further to these embodiments, data processing module 322 presents specific user information via a user interface depending on the user type. In an example, a donor can be presented with: a list of potential recipients; donor's goal gauges and goal gauges of recipients and/or other donors; goals associated with potential or current recipients; the amount of funds or assets previously allocated to goals by said donor; donor's funds or donor's assets available for contribution; available products for contribution; chronological life events of recipients; and the like. In this example, a recipient can be presented with: the recipient's goals or goals of other recipients; the recipient's goal gauges and/or goal gauges of other recipients and donors; a list of donors who have contributed to the recipient's goals; a list of potential donors sorted, for example, based on relationship type; available products; and the like. In other embodiments, both donors and recipients can configure their profiles to present user information to other users based on personal preferences or level of transparency in terms of goal data that would like to be shared with other users in the financial registry system.

In some embodiments, data processing module 322 supports a plurality of transactions across the financial registry system. In these embodiments, data processing module 322 can aggregate financial accounts that donors and recipients may have with different financial institutions. These financial institutions can function as service partners within the financial registry system. Further to these embodiments, data processing module 322 allows the transfer of funds from financial accounts of donors and recipients according to their established goals. For example, a parent acting as a donor can transfer a specific amount of funds from his/her bank account to the savings account of his teenage son who shared the goal of "contribute to the purchase my first car."

In other embodiments in which data processing module 322 supports a plurality of transactions across the financial registry system, data processing module 322 receives and processes a request from a recipient or donor for purchasing a particular insurance product from product database 320 to contribute to an established goal. Further to these embodiments, data processing module 322 receives and processes a request from a recipient or donor for purchasing a product from service partners in order to complement the purchased insurance product. In some embodiments, data processing module 322 supports payments from accounts created within the insurance company, accounts from partner financial institutions, or accounts from digital wallet/e-commerce businesses such as PayPal.

In some embodiments, data processing module 322 supports micro-lending transactions. In these embodiments, donors can provide funds to recipients depending on current financial conditions. For example, parents starting retirement may have a substantial amount of cash in a savings account that just pays around 1%. In this example, their son or daughter may be a recipient who has the goal of "buying a house". Acting as donors, parents can lend funds at an interest rate higher than 1% and receive an additional source of income during retirement, while contributing to the goal of their son or daughter.

In other embodiments, goals analysis module 324 analyzes the profiles of recipients and donors in order to present one or more predetermined goals to them, according to their user profiles. The goals are presented through the user interface running on one or more computing devices. Further to these embodiments, goals analysis module 324 can employ needs forecasting algorithms in order to estimate probable goals according to a combination of factors, for example, age, gender, educational and professional status, health condition, marital status, number of dependent children, financial status, and the like.

In some embodiments, goals analysis module 324 performs automatic re-balancing of goals according to the changing needs or living conditions of recipients and donors. For example, a young recipient may have initially established the goal of reaching a certain amount of assets in an investment account with moderate-high risk. Continuing the example, as the recipient ages, goals analysis module 324 determines the recipient needs to open a retirement account and communicates that need to the recipient. Further to this example and upon receipt of instructions from recipient, goals analysis module 324 sends a request to data processing module 322 instructing the transfer of funds from the investment account to the retirement account.

In some embodiments, goals analysis module 324 analyzes the goals established by recipients and donors in order to present one or more products that may fulfill those goals. In these embodiments, the products are presented through the user interface running on one or more computing devices. Further to these embodiments, goals analysis module 324 associates the user profiles and goals of recipients and donors with insurance products available within product database 320 using goals analysis algorithms, such as, NestLife. In these embodiments, goals analysis module 324 selects a list of insurance products available in product database 320 and presents those insurance products to recipients and donors. In other embodiments, goals analysis module 324 selects one or more products from service providers to complement the insurance product offering presented to donors and recipients.

FIG. 4 is an exemplary table illustrating the matching of a plurality of goals with a plurality of products, in accordance with an embodiment. In some embodiments, the financial registry system described herein allows one or more recipients to share multiple goals with other users. In these embodiments, one or more donors can contribute to those goals by providing funds or purchasing one or more products. With the received funds, recipients can purchase multiple products to fulfill their goals.

In FIG. 4, table 400 includes one or more products 402 and one or more goals 404. In table 400, products 402 can be purchased in order to fulfill any number of goals 404. Examples of goals 404 include: obtaining funds for college education; funds for the purchase of a car or home; retirement plan; healthcare coverage; savings for children; and funds to finance a weeding or honeymoon, among others. Further to these embodiments, goals 404 can be triggered by life events such as a graduation, birth of children, marriage, and the like. Yet in other embodiments, goals 404 can be triggered by recurring events such as holidays, birthdays, and the like.

In some embodiments, some products 402, such as, insurance protection (e.g., life, DI, LTC, annuities, etc.) and 529 plans are provided by an insurance company. Further to these embodiments, the disclosed financial registry system integrates the offerings of the insurance company with the product offerings of a plurality of service partners to provide a holistic set of financial solutions. Examples of products 402 available from service partners include healthcare plans and savings accounts. In other embodiments, products 402 available from service partners (not shown in Table 400) include online gifts such as a physical item, a physical or virtual card that has monetary value or is redeemable via a point of sale at one or more merchants, a service, a gift certificate redeemable at one or more merchants, and the like.

FIG. 5 illustrates an exemplary scenario for balancing and monitoring the goals of recipients and donors, according to an embodiment. In some embodiments, the financial registry system described herein allows donors and recipients to set funding targets and priorities for goals. In these embodiments, the financial registry system allows the monitoring and balancing of goals of recipients and donors using one or more goal gauges.

In FIG. 5, a graphical user interface 500, which may be presented on a web browser or other application interface, may be accessed and presented to one or more donors (shown as donor avatar 502), one or more recipients (shown as recipient avatar 504), and may include textual and graphical representations of one or more recipient goals 506 and one or more donor goals 508. In some embodiments, one or more recipient goals 506 includes indicator graphics, shown as goal gauges, such as, recipient goal gauge 510, and one or more donor goals 508 includes indicator graphics, shown as goal gauges, such as, donor goal gauge 512. A graphical user interface can present these indicator graphics, whereby the indicator graphics are based upon data values stored in the analytics engine server or associated database. The indicator graphic, such as a goal gauge, can be a semi-circular object that can represent progress of a value toward a certain goal. It is intended that the indicator graphic can take the form of other graphical representations on the graphical user interface. In one example, if a goal is to save $1000 and the user currently has $100, the indicator graphic may show that the user has achieved one-tenth of the goal. If there is more than one goal, then more than one indicator graphic may be displayed on the graphical user interface, where each indicator graphic can represent each goal. The analytics engine server can automatically and dynamically adjust and resize the indicator graphic to account for a change in an allocation, amount, goal, or other setting. The adjustment and resizing allows the user (recipient or donor) to experience in real-time a projected change in progress toward a goal upon a particular implementation.

The analytics engine server can display the indicator graphics along with associated text on the graphical user interface of the recipient and/or donor computers. In one embodiment, a donor can input an amount in the graphical user interface, which is transmitted to the analytics engine server. The analytics engine server then generates data regarding the allocation of that amount to one or more goals and saves that data in a database. The graphical user interface can be refreshed with one or more new indicator graphics, or the one or more indicator graphics can be automatically adjusted based upon the generated data.

In an exemplary process, a computer-implemented method comprises generating, by the analytics engine server, a first financial goal and a second financial goal for a recipient based upon a recipient profile data stored in a database; generating, by the analytics engine server, a graphical user interface containing a first indicator graphic having a size proportional to a value of the first financial goal and a second indicator graphic having a size proportional to a value of the second financial goal; receiving, by the analytics engine server, an input from the graphical user interface representing a donor amount and an indication of allocation of the donor amount to the first financial goal and the second financial goal; and automatically resizing, by the analytics engine server, the first indicator graphic and the second indicator graphic based upon the donor amount and the indication of allocation.

In another embodiment, the analytics engine server can present a plurality of options for the donor to allocate the amount. For example, the analytics engine server can present a first contribution option based upon applying the amount to a first goal, a second contribution option based upon applying the amount to a second goal, and a third contribution option based upon applying the amount to both the first goal and the second goal. A hyperlink (or other selectable mechanism or input mechanism on a user interface) can be presented for each option, whereby the donor can select the hyperlink representing each option, and the analytics engine server will dynamically adjust the indicator graphics according to the selected contribution option. One or more components of the graphical user interface can be dynamically adjusted and updated (e.g., resizing an indicator graphic), or the graphical user interface can be automatically refreshed and a new graphical user interface can be presented.

In an exemplary process, computer-implemented method comprises generating, by the analytics engine server, a first financial goal and a second financial goal for a recipient based upon a recipient profile data stored in a database; generating, by the analytics engine server, a graphical user interface containing a first indicator graphic having a size proportional to a value of the first financial goal and a second indicator graphic having a size proportional to a value of the second financial goal; receiving, by the analytics engine server, a transmission from a computing device of a donor comprising data representing a donor amount; generating, by the analytics engine server, first data representing an updated value of the first financial goal and an updated value of the second financial goal based on a first contribution of the donor amount to only the first financial goal; generating, by the analytics engine server, second data representing an updated value of the first financial goal and an updated value of the second financial goal based on a second contribution of the donor amount to only the second financial goal; generating, by the analytics engine server, third data representing an updated value of the first financial goal and an updated value of the second financial goal based on a third contribution of the donor amount to the first financial goal and the second financial goal; presenting, by the analytics engine server, the graphical user interface for display on the computing device of the donor having the first indicator graphic and the second indicator graphic based upon the first data; upon selection of a hyperlink representing the second contribution, dynamically adjusting, by the analytics engine server, the size of the first indicator graphic and the second indicator graphic based upon the second data; and upon selection of a hyperlink representing the third contribution, dynamically adjusting, by the analytics engine server, the size of the first indicator graphic and the second indicator graphic based upon the third data.

Donors 502 and recipients 504 have one or more donor goals 508 and recipient goals 506, respectively, which may be the same, similar, or different goals. Recipient goals 506 and donor goals 508 can be prioritized based on the profiles and life events of associated donors 502 and recipients 504. For example, donors 502 can be grandparents who have donor goals 508 of retirement and healthcare, while recipients 504 can be young parents having recipient goals 506 of retirement, home ownership, and saving for the education of their two children. In this example, the grandparents may prioritize retirement over healthcare, while the young parents may prioritize their goals as home ownership first, education of their children second, and retirement third. In some embodiments, the goals prioritization process can be assisted by a goals analysis module which can recommend a goal prioritization order to donors 502 and recipients 504 based on the profiles and life events of donors 502 and recipients 504. Continuing the example, for young parents between the ages of 25 and 45, the goals analysis module may recommend to prioritize home ownership over retirement.

In other embodiments, recipient goals 506 and donor goals 508 are monitored using one or more graphical goal gauges, such as, for example recipient goal gauge 510 and donor goal gauge 512. In these embodiments, recipient goal gauges 510 can be generated by the goals analysis module and presented to recipients 504, and donor goal gauges 512 can be generated by the goals analysis module and presented to donors 502. Further to these embodiments, recipient goal gauges 510 and donor goal gauges 512 are presented to donors 502 and recipients 504 through a user interface running on one or more computing devices. In some embodiments, recipients 504 enable donors 502 to access one or more recipient goal gauges 510 so that donors 502 can determine the progress of recipient goals 506. In an example and referring to FIG. 1, recipients 102 enable donors 106 to access one or more recipient goal gauges so that donors can determine the progress of recipient goals by modifying the recipient's associated modified user profile.

In some embodiments, recipient goal gauges 510 and donor goal gauges 512 include different levels of achievement for monitoring the progress of associated recipient goals 506 and donor goals 508, respectively. In these embodiments, the goal gauges can include low, medium and high levels of achievement for monitoring the progress of the associated goals. For example, in scenario 500, recipients 504 (e.g., young parents) have a low level of achievement for retirement, a medium to high level of achievement for the education fund for Kate (e.g., the first child), a medium to low level of achievement for the education fund for John (e.g., the second child), and a high level of achievement for home ownership.

In some embodiments, recipient goal gauges 510 and donor goal gauges 512 can be used to prioritize goals of recipients 504 and donors 502 based on the associated level of achievement for each goal. For example and referring to recipient gauges 510, recipients 504 have a high level of achievement for the home ownership goal while their retirement goal has a low level of achievement. Further to this example, recipients 504 may decide to reprioritize the retirement goal over the home ownership goal.

In some embodiments, the levels of achievement as indicated by recipient goal gauges 510 and donor goal gauges 512 correspond to specific funding targets set by donors 502 and recipients 504. In these embodiments, the funding targets can correspond to a specific amount of money that recipients 504 and donors 502 would like to allocate for the fulfillment of their associated goals. Further to these embodiments, the goals analysis module recommends funding amounts for recipient goals 506 and donor goals 508 based on the profiles of recipients 504 and donors 502 and the priorities set for their associated goals.

In some embodiments, donors 502, via the user interface, can check donor goal gauges 512 and recipient goal gauges 510 to decide how much funds donors 502 have available to contribute to recipient goals 506. For example, donors 502 (e.g., grandparents) may have a high level of achievement for their retirement goal portion of donor goals 508 indicating that a portion of the funds currently being allocated for their retirement goal could be used for contributing to one or more recipient goals 506 of recipients 504 (e.g., young parents). In this example, the grandparents can donate funds to the young parents for contributing to one or more recipient goals 506. Further to this example, the young parents check their recipient goal gauges 510 and decide to allocate a portion of the funds destined for the goal of home ownership, which has a high level of achievement, to the goals of retirement and the education of John which have lower levels of achievement.

In an embodiment, the financial registry system facilitates the monitoring and balancing of goals of recipients and donors by presenting two or more goal contribution assumptions to a donor in order to aid the donor in selecting among these goal contribution assumptions. In an embodiment, a donor inputs a given donor amount, and the analytics engine 116 determines how each of the two or more goal contribution assumptions affects one or more financial goal of a recipient. A goal contribution assumption consists of one or more financial goal of a given recipient, and an allocation of the given donor amount as contribution(s) to each of the one or more financial goal of the recipient. Analytics engine 116 displays to the donor via user interface 108 a graphical representation of how each contribution assumption affects each of the one or more financial goal of the recipient. In one embodiment, to show the effect of a given goal contribution assumption, analytics engine 116 displays for each of the one or more financial goal of the recipient a recipient goal gauge 510 showing the current level of achievement of that financial goal, and a recipient goal gauge 510 showing the level of achievement of that financial goal after including the allocated contribution in that goal contribution assumption. In an embodiment, user interface 108 presents the two or more goal contribution assumptions as options for selection by the donor for contributing the given donor amount to identified financial goal(s) of the recipient.

In an exemplary embodiment, the financial registry system presents first, second, and third goal contribution assumptions as options to a donor seeking to contribute a donor amount. In the first goal contribution assumption, the entire donor amount is contributed to the a financial goal. In the second goal contribution assumption, the entire donor amount is contributed to a second financial goal. In the third goal contribution assumption, a first portion of the donor amount is contributed to the first financial goal, and a second portion of the donor amount is contributed to the second financial goal. The analytics engine 116 presents via user interface 108 recipient goal gauges 510 showing how each of the three goal contribution assumptions affects the first financial goal, the second financial goal, or both financial goals. The financial registry system presents the three goal contribution assumptions as options for selection by the donor, for contributing the given donor amount to financial goal(s) of the recipient associated with the selected goal contribution assumption.

In some embodiments, the goals analysis module automatically provides recommendations to donors 502 and recipients 504 as to how to balance the funds allocated to recipient goals 506 based on the profiles for donors 502 and recipients 504, level of achievement measured through recipient goal gauges 510 and donor goal gauges 512, and goal prioritization. For example, the goals analysis module can recommend grandparents to donate a portion of the funds destined for their retirement goal to the retirement goal of the young parent as well as to the education of John.

In some embodiments, the goals analysis module can generate different version of recipient goal gauges 510 for presentation to recipients 504, and can generate different versions of donor goal gauges 512 for presentation to donors 502, depending on access privileges of the recipients and donors. For example, for recipients and donors who have relatively high access privileges, the goals analysis module may display goals gauges including specific financial values of target goals and specific financial values of achievements of these goals. On the other hand, for recipients and donors who have relatively low access privileges, the goals analysis module may omit these specific financial values from displayed goal gauges.

Figure 6:
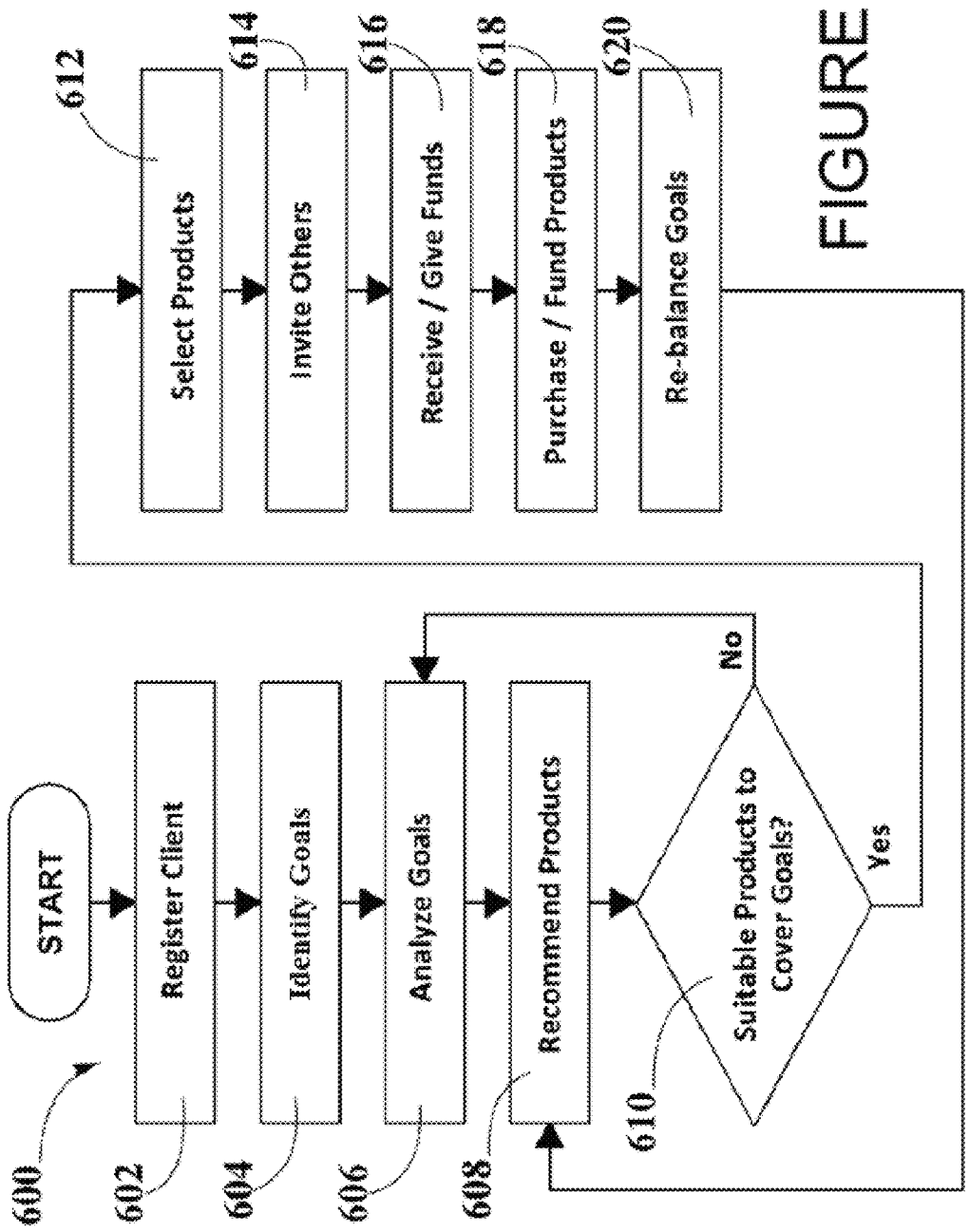
FIG. 6 is a flowchart describing a goal collaboration method for providing solutions to a plurality of established goals, according to an embodiment.

FIG. 6 is a flowchart of a goal collaboration method for providing solutions to a plurality of established goals, according to an exemplary embodiment. In FIG. 6, method 600 includes a plurality of steps that may be performed by one or more computing devices, such as, computing device 200 of FIG. 2 implementing/running one or more software modules/processes of the exemplary operating environments of FIGS. 1 and 3. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

Method 600 starts at step 602 where a user registers with a financial registry system. In some embodiments, the user registers and provides user information to a financial registry system by interacting with a user interface running on a computing device. In these embodiments, the computing device is operatively coupled with an analytics engine through a communication network. A data processing module within the analytics engine processes user information and creates a user profile that can be stored at a client database. User profiles can include username and password, as well as other relevant user information such as age, gender, ethnicity, place of residence, number and identity of dependent persons (e.g. children, dependent adults), health records, expenditure, savings, approximate market value of assets and their composition, education, and professional situation, among others. In some embodiments, users register themselves as recipients or donors. Method 600 continues to step 604.

At step 604, one or more users establish goals according to their needs. In some embodiments, one or more users identify goals by providing goal data via the user interface running on one or more computing devices. (Note, the following discussion of the method 600 of FIG. 6 refers to actions and inputs of both recipients and donors, but it is also possible for certain steps of this method such as Identify Goals 604 to be effected with actions of only recipients, or with actions of only donors). For example, recipients can use the keyboard of a computing device to enter the goal of "saving for the down-payment on my future house" in the user interface. In another example, donors can use the keyboard of the computing device to enter the goal of "saving for retirement" in the user interface. In these examples, the identified goals are qualitative, general financial goals.

In some embodiments, recipients and donors select one or more goals from a list of predetermined goals presented through the user interface running on computing devices. This list of predetermined goals can be generated by a goals analysis module within the analytics engine. In these embodiments, for the generation of the list of predetermined goals, the goals analysis module can employ needs forecasting algorithms in order to recommend probable goals to the user according to the user information stored in the user profile of the recipient and donor. In other embodiments, goals can be recommended according life events or recurring events associated with the recipients. For example, for a recipient who recently got married, the goals analysis module can estimate several goals, such as "buying a home" and "acquiring life insurance".

In some embodiments, the goals analysis module uses goal gauges to balance the goals between donors and recipients. For example, one or more goal gauges of a donor may indicate that one or more goals of the donor may have a high level of achievement. The high level of achievement in one or more donor's goals may suggest that there may be some funds available for donation to one or more recipient's goals. In this example, the goals analysis module may determine that some donor's funds may be available for contribution to one or more recipient's goals which may have a low level of achievement.

In other embodiments, the goals analysis module uses goal gauges to prioritize the list of predetermined goals presented to donors and recipients. For example, the goals analysis module may prioritize goals with low level of achievement over goals with high level of achievement. Method 600 continues to step 606.

At step 606, the goals analysis module within the analytics engine analyzes the identified goals in order to make product recommendations. In some embodiments, the goals analysis module analyzes the goals identified by recipients and donors by analyzing the modified user profiles of the recipients and donors e.g. to analyze recipients' financial circumstances and needs, and thereby may quantify goals that were qualitative as identified by users. The goals analysis module additionally may compare the goals identified by recipients and donors with the insurance products available in a product database. In these embodiments, the product database includes product data about products or services available from an insurance company, such as, annuities, disability insurance (DI), individual retirement accounts (IRA), investments, life insurance, LTC care insurance, and 529 plans, among others. Further to these embodiments, the goals analysis module may employ goals analysis algorithms such as NestLife to associate the user profiles and goals of recipients and donors with products available in the product database. In other embodiments, the goals analysis module selects one or more products from one or more service partners in order to complement the insurance product offering. Method 600 advances to step 608.

At step 608, the goals analysis module recommends a list of products (e.g., one or more insurance products, etc.) based upon the analysis 606 of recipients and donors goals. In some embodiments, the goals analysis module recommends a list of products by presenting a list of insurance products through the user interface running on one or more computing devices. In an example, a recipient who recently was married is presented with insurance products, such as, life insurance, health insurance, long term care (LTC), and the like. In this example, the same recipient may have a personal goal of "saving for the down-payment for my house". In this example, the goals analysis module recommends opening a bank account with a service partner to complement the insurance product offering. Further to this example, the recipient may have the goal of "planning to have a baby within the next year". In such case, the goals analysis module can recommend acquiring a health insurance program for children with a service partner according to the modified user profile of the recipient. In this way, the goals analysis module can present multiple products from the insurance company and service partners to fulfill multiple goals. Method 600 continues to step 610.

At step 610, the recipients and donor review the recommended products presented to them through the user interface running on computing devices. Recipients determine if the recommended products can satisfy their identified goals. Similarly, donors determine if the recommended products will satisfy their goals and goals of recipients for which they wish to contribute. If the recommended products do not fully satisfy the goals of recipients and donors, method 600 returns to step 606 to continue with the analysis of goals and recommendation of products. In some embodiments, the goals analysis module complements the insurance product offerings with other products available from service partners. If the recommended products satisfy the goals of recipients and donors, method 600 continues to step 612.

At step 612, the recipients and donors select one or more products. In some embodiments, the recipients and donors select one or more products via the user interface running on one or more client computing devices. In these embodiments, the data processing module updates the modified user profiles with the products selected by the recipients and donors, and stores the updated modified user profiles at the client database. Further to these embodiments, the data processing module computes trends based on the historical selection of products. In these embodiments, these trends can be used by the goals analysis module to refine product recommendations. Method 600 continues to step 614.

At step 614, the recipients invite other people to contribute to their goals. In some embodiments, recipients invite donors to contribute to their goals by using the user interface running on computing devices. In these embodiments, recipients use the user interface running on computing devices to connect with social networks and share their goals with family members, relatives, and friends. Examples of social networks include Facebook®, Twitter®, LinkedIn®, Pinterest®, Google+™ Instagram®, and the like. In an example, recipients can share the goal of "please contribute to the purchase of my new car" among their contacts in Facebook®. In this example, Facebook® contacts who would like to contribute to the goal of "please contribute to the purchase of my new car" can register with the financial registry system as donors. Method 600 continues to step 616.

At step 616, donors provide funds to recipients. In some embodiments, donors browse through the list of goals shared with the donors by the recipients through the user interface. In these embodiments, the donors specify an amount of funds that they would like to provide to recipients for contribution to the shared goals. Further to these embodiments, the data processing module within the analytics engine processes the donation of the donors and transfers the specified amount of funds from associated accounts of the donors to associated accounts of the recipient. In some embodiments, the donor and/or recipient accounts are registered with the insurance company and/or service partners. In these embodiments, the donor/recipient accounts are managed by the data processing module. Method 600 continues to step 618.

At step 618, users purchase one or more products to fulfill goals. In some embodiments, using the funds provided by donors, recipients purchase the products they previously selected through the user interface running on computing devices. In these embodiments, the purchase order is processed by the data processing module which debits the funds from the associated accounts of the recipient. In other embodiments, a donor can directly contribute to the goals of a recipient by purchasing one or more products for the benefit of the recipient. For example, a parent or grandparent can acquire an annuity product for his or her retirement that is used in the short term to fund a child's or grandchild's goal of "saving for my college education". Method 600 continues to step 620.

At step 620, a plurality of user goals are rebalanced. In some embodiments, the goals analysis module within the analytics engine continuously adjusts the goals of recipients and donors as the goals change over time. In an example, the goals analysis module analyzes current goals associated with a recipient versus potential future goals of the recipient in order to determine if the goals need to be modified. For example, a young parent may have the current goal of "saving for my child's education". However and as time goes by, the goals analysis module presents a new goal of "saving for retirement" to the parent. Further to this example, the goals analysis module recommends the amount of newly acquired funds to be directed between the retirement account and college saving account.

In some embodiments, current versus future goals are continuously reevaluated. In these embodiments, the goals analysis module recommends new products based on new/modified goals over time. In further embodiments, the goals analysis module recommends and prioritizes products according the age and life stage of recipients and donors. For example, the goals analysis module can recommend insurance products in the following order: disability income insurance (DI), life insurance, long term car insurance (LTC), an annuity, and the like.

In some embodiments, the data processing module within the analytics engine sends regular updates to donors within the financial registry system regarding new goals set by recipients and donors, or if goals have been fulfilled. In other embodiments, the data processing module within the analytics engine sends regular updates to contacts within social networks regarding any new goals set by recipients, or if goals have been fulfilled.

By executing method 600 using the exemplary operating environments described in FIGS. 1-3, big data analytics and data mining techniques can be implement for a more efficient and faster processing of larger data sets. In this way, efficiencies are created by providing an insurance company or other financial institution with ways to automatically identify customers' personal goals and recommend respective financial solutions to fulfill those goals. In addition, recipients and donors can use an integrated collaboration environment to share and contribute to common goals. These features allow performing large amounts of work, such as heavy calculations and time consuming analysis, in a more efficient manner compared to approaches involving extensive manual work and analysis by humans.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A computer-implemented method comprising:
generating, by an analytics engine server executing a predictive algorithm, a set of financial goals for a recipient based upon a recipient profile data stored in a database and from recipient attributes received from a recipient computing device;
automatically selecting, by the analytics engine server, a first financial goal and a second financial goal from the set of financial goals where a first recipient attribute associated with a category of the first financial goal satisfies a first threshold and a second recipient attribute associated with a category of the second financial goal satisfies a second threshold;
generating, by the analytics engine server, a graphical user interface containing a first indicator graphic having a size proportional to a value of the first financial goal and a second indicator graphic having a size proportional to a value of the second financial goal;
receiving, by the analytics engine server, a transmission from a computing device of a donor comprising data representing a donor amount;
generating, by the analytics engine server, first data representing an updated value of the first financial goal, the value of the second financial goal, a first resized first indicator graphic, and the second indicator graphic based on a first contribution of the donor amount to only the first financial goal;
generating, by the analytics engine server, second data representing the value of the first financial goal, an updated value of the second financial goal, the first indicator, and a first resized second indicator graphic based on a second contribution of the donor amount to only the second financial goal;
generating, by the analytics engine server, third data representing an updated value of the first financial goal, an updated value of the second financial goal, a second resized first indicator graphic, and a second resized second indicator graphic based on a third contribution of the donor amount to the first financial goal and the second financial goal;
displaying, by the analytics engine server, the graphical user interface on the computing device of the donor having the first indicator graphic and the second indicator graphic based upon the first data;
upon selection of a hyperlink representing the second contribution, dynamically adjusting, by the analytics engine server, the size of the first indicator graphic and the second indicator graphic based upon the second data;
upon selection of a hyperlink representing the third contribution, dynamically adjusting, by the analytics engine server, the size of the first indicator graphic and the second indicator graphic based upon the third data;
receiving, by the analytics engine server from the computing device of the donor, a selection of at least one of the first financial goal and the second financial goal, whereby the selection indicates to which financial goal account the donor amount is transmitted;
continuously monitoring, by the analytics engine server, recipient attributes including an updated first attribute of the first financial goal and an updated second attribute of the second financial goal;

identifying, by the analytics engine server based on at least one monitored recipient attributes, a third financial goal from the set of financial goals; and displaying, by the analytics engine server on the graphical user interface, a third indicator graphic having a size proportional to a value of the third financial goal.

* * * * *